(No Model.)
C. G. MOREMEN.
EGG TESTER.
No. 574,854.            Patented Jan. 5, 1897.
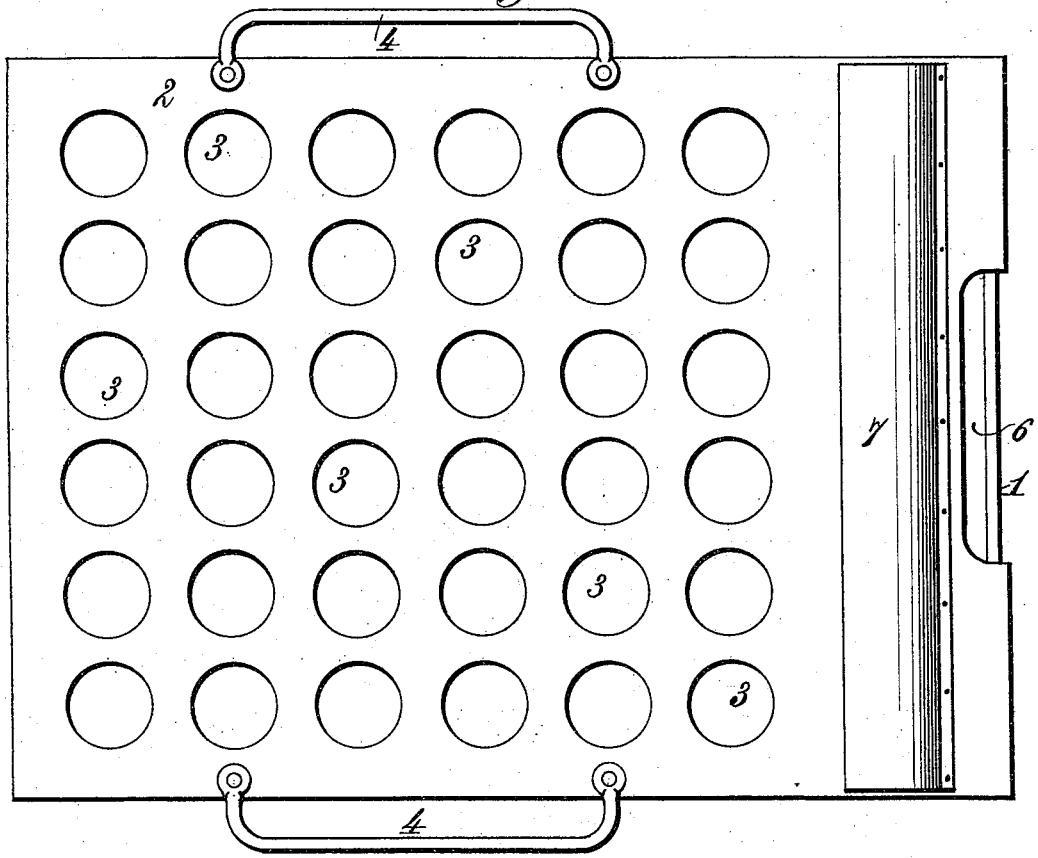
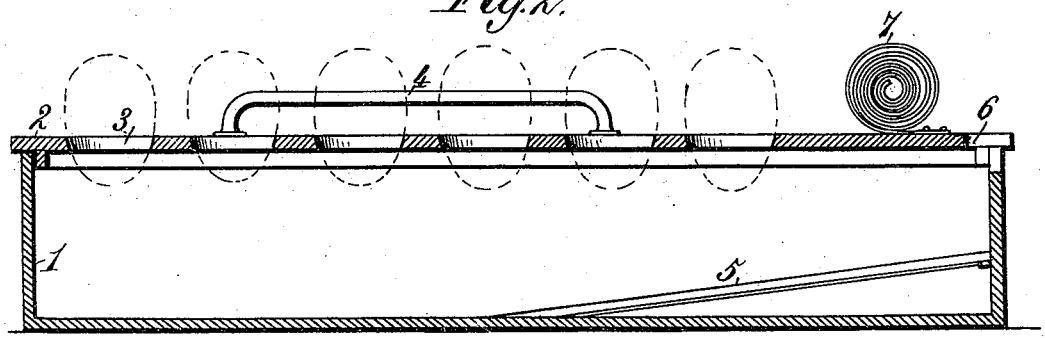
Witnesses.
Robert Covitt,
Thos. A. Gunn
Inventor.
Charles G. Moremen
By James L. Norris
Atty.

UNITED STATES PATENT OFFICE.

CHARLES G. MOREMEN, OF BRANDENBURG, KENTUCKY.

EGG-TESTER.

SPECIFICATION forming part of Letters Patent No. 574,854, dated January 5, 1897.

Application filed April 9, 1896. Serial No. 586,812. (No model.)

*To all whom it may concern:*

Be it known that I, CHARLES G. MOREMEN, a citizen of the United States, residing at Brandenburg, in the county of Meade and State of Kentucky, have invented new and useful Improvements in Devices for Testing Eggs, of which the following is a specification.

This invention relates to a device for testing eggs, and has for its object to provide means whereby each of a series of eggs arranged in parallel rows may be separately examined without disturbing the other rows, thus effecting an economy in time in the operation.

To this end my invention consists in the novel features and in the construction and arrangement of parts hereinafter described, and pointed out in the claim following the description, reference being had to the accompanying drawings, forming a part of this specification, wherein—

Figure 1 is a plan view of an egg-tester made in accordance with my invention, and Fig. 2 is a longitudinal section thereof.

Referring to the drawings, the numeral 1 indicates a rectangular box or casing closed upon its sides and bottom and having an open top. In the open top of the box or casing is adapted to be seated a tray 2, having a series of perforations 3, each of a diameter slightly less than the largest diameter of an ordinary egg, said perforations being arranged in parallel rows, as shown.

The trays 2 completely cover the upper open end of the box 1 and are provided with laterally-projecting bails or handles 4, by means of which they may be placed in and removed from position. Arranged in the box or casing 1 is a mirror 5, which is inclined relatively to the floor of the box at an obtuse angle, the angle being such as will hereinafter be described and will be readily understood.

The end of the tray 2 opposite the series of perforations is provided with a slot 6, and to the upper side of each tray, at a point between said slot and the first or adjacent row of perforations 3, is arranged a rolled curtain 7. The curtain 7 is attached at one end to said tray in any suitable manner, as by tacks or glue, and is of sufficient length when unrolled to cover the entire tray. The mirror 5 is arranged at such an angle relative to the tray 2 that the line of vision through the slot 6 will fall upon the mirror at an angle equal to the angle of reflection from the eggs placed in the perforations of the tray above.

It will be readily understood that by placing eggs in the perforations in the tray and fitting the tray in the upper open end of the box or casing and then applying the eyes to the slot in the end of the tray the light will be transmitted through the eggs and indicate to the observer their condition.

By means of the curtain 7 the rows of eggs may be successively darkened, so that the vision will not be disturbed by the light transmitted through the eggs that have already been tested, and when the device is not in use the curtain serves to exclude the entrance of dust, which would otherwise settle upon the mirror.

In practice a plurality of trays will be provided with each box, in order that one tray of eggs may be examined while the eggs are being placed in position in another tray.

What I claim is—

In an egg-tester, the combination with a box provided with a sight-opening at one end and having an inclined mirror arranged in its bottom, of a perforated tray removably supported on the box and a flexible opaque curtain attached to one end of said tray and adapted to be rolled up to uncover any number of the perforations desired, substantially as described.

In testimony whereof I have hereunto set my hand in presence of two subscribing witnesses.

CHARLES G. MOREMEN.

Witnesses:
  H. H. HARRINGTON,
  W. H. GOUGH.